United States Patent
Sánchez de León Rodríguez Roda

(10) Patent No.: US 6,691,857 B2
(45) Date of Patent: Feb. 17, 2004

(54) AUTOMATIC ALTERNATING FRUIT FEEDER TO A CELL RECEIVER IN QUINCUXES

(75) Inventor: Juan Antonio Sánchez de León Rodríguez Roda, Jesús Morante Borrás (ES)

(73) Assignee: Food Machinery Espanola, S.A. (ES)

( * ) Notice: Subject to any disclaimer, the term of this patent is extended or adjusted under 35 U.S.C. 154(b) by 0 days.

(21) Appl. No.: 10/210,321

(22) Filed: Aug. 1, 2002

(65) Prior Publication Data

US 2003/0062246 A1 Apr. 3, 2003

(30) Foreign Application Priority Data

Sep. 28, 2001 (EP) .............................. 01500240

(51) Int. Cl.⁷ .............................................. B65G 47/26
(52) U.S. Cl. ...................... 198/434; 198/436; 198/817
(58) Field of Search ................... 198/434, 437, 198/436, 382, 415, 394, 458, 817

(56) References Cited

U.S. PATENT DOCUMENTS

| | | | | |
|---|---|---|---|---|
| 4,043,442 A | * | 8/1977 | Greenwell et al. | 198/817 |
| 4,709,799 A | * | 12/1987 | Ljungberg | 198/817 |
| 4,720,006 A | * | 1/1988 | Lenherr | 198/415 |
| 5,191,962 A | * | 3/1993 | Wegscheider et al. | 198/415 |
| 5,918,725 A | * | 7/1999 | Farina | 198/415 |

* cited by examiner

Primary Examiner—Joseph E. Valenza
(74) Attorney, Agent, or Firm—Lackenbach Siegel LLP

(57) ABSTRACT

Supply lines, formed by two V-shaped belts (1)–(1') that go in the same direction at different speeds; Photoelectric cells (2) on the first transversal alignment of cells and others (3) on the fruit outlet of the feeder; Pneumatic cylinders that separate or group the outlet ends of the supply lines, turning on their inlet ends: Detection means (6) of the arrangement of the cells to suitably position the supply lines; Means (7) to check loading on the inlet ends of the feed lines, that operate as a transporter (8) to regulate and give continuity to the general supply.

3 Claims, 2 Drawing Sheets

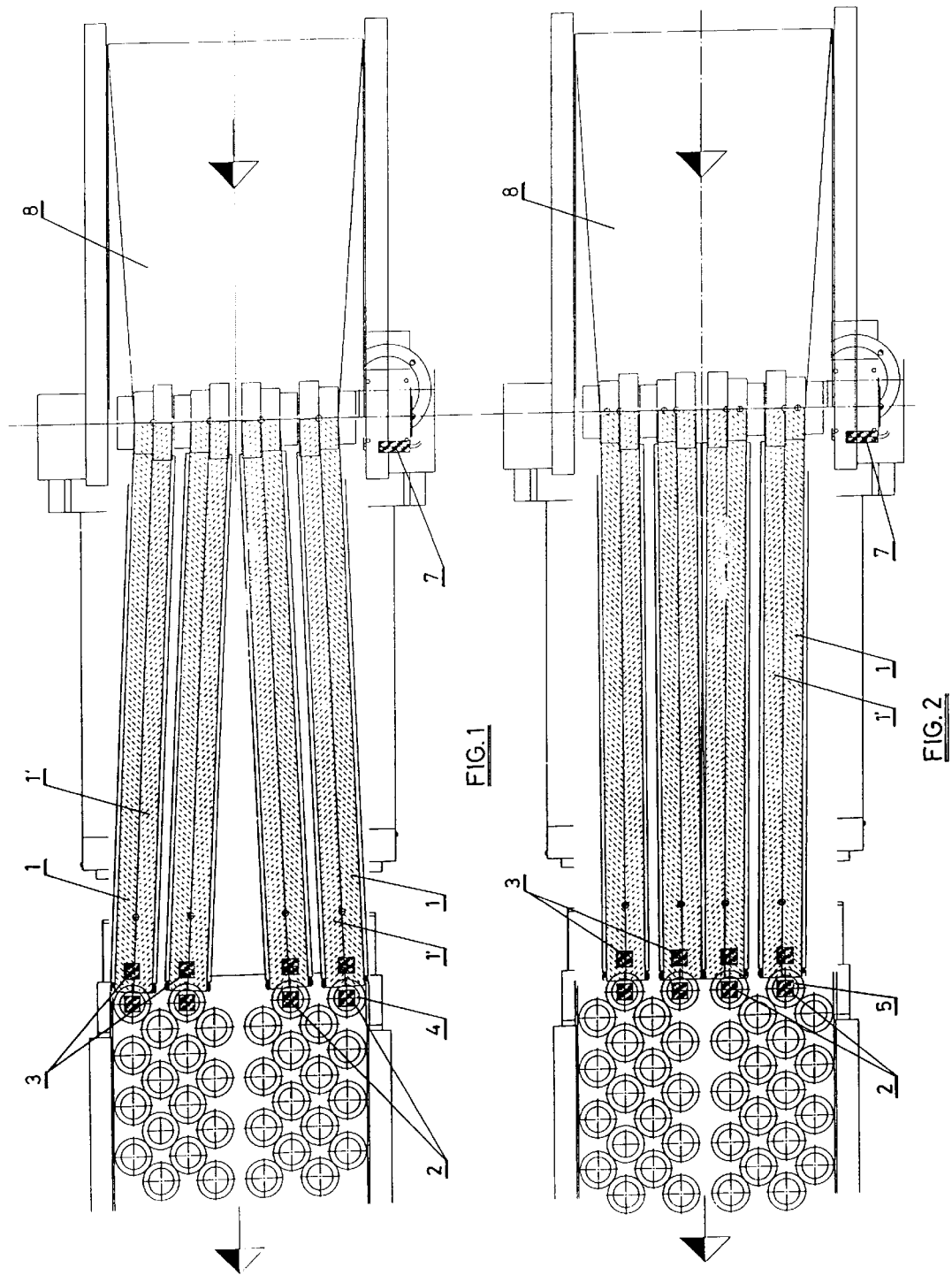

AUTOMATIC ALTERNATING FRUIT FEEDER TO A CELL RECEIVER IN QUINCUXES

PURPOSE

The purpose to which the invention protected by this patent refers consists in an "Automatic alternating fruit feeder to a cell receiver in quincunxes", in which the fruit is arranged in transversal alignments of equal or different parity.

The receiver can be a tray or intermediate transportation element, forming a part of said receiver and, in any case, a chain of means for orderly movements of the fruit for which said means move in an coordinated way.

HISTORY

The canning of fruit in prismatic boxes of a spherical shape is made automatically by means of pneumatic enchasing machines that have vents arranged in number and position that, when each one takes a piece of fruit, they move and place the fruit in an orderly way in the box in horizontal layers.

In order to take advantage of the inside volume of the can, the successive layers must be placed in such a way that each piece of fruit of the upper layer rests on the concavity formed by the four pieces of fruit of the lower layer, thus holding the fruit during transportation of the box.

In the event the receiver is a tray, the operation is simplified as the fruit usually occupies one layer only.

So that the vents of the enchasing machine operate correctly, they have to align the fruit alternately in the orderly and displaced positions of the even and uneven layers that fill the box. This is the function carried out by the cell transporter.

In fact, it is a horizontal plane, mobile in the longitudinal direction, articulated or flexible, with circular, shallow cells on its upper face that form longitudinal and transversal alignments arranged in quincunxes so that the vents of the enchasing machine can take the fruit housed individually in the cells, in a suitable position to be orderly placed inside the box.

At the same time, it is designed as a novelty that both the tray and the cell transporter must be supplied automatically and in such a way that the fruit is delivered aligned, positioned so that it sits on one if its poles and alternately on the end or central cells of the successive transversal alignments in quincunxes.

DESCRIPTION OF THE INVENTION

The aim of the invention constituting the purpose of this patent consists in the idea and design of an automatic alternating fruit feeder to trays or cell transporters, which complies with the functional requirements needed, according to the above description.

In this regard, two basic conditions must be reached simultaneously: synchronism in the movements of the different means constituting the fruit supply chain and alternation of said supply to the cell receiver.

In fact, the shape of the latter described above, requires that its feeder, purpose of this patent, must have the following functional characteristics:
a) To transfer the fruit to the cells alternately in each transversal alignment as said alignments are displaced, to form the arrangement in quincunxes of the cells
b) To give mobility to the supply lines (or at least their outlet ends) in order to facilitate the required alternate supply
c) To position the fruit whilst it is transported by the supply line in order to place it in the respective cells and correct position The supply line includes three different transport means which are independent, successive and have coordinated movements:
  A conventional transporter that acts as supply regulator and admits the fruit to the feeder
  An intermediate feeder, purpose of this patent, in which the positioning (alignment and orientation) of the fruit is produced
  A mobile tray or cell transporter that goes directly to the enchasing machine with the fruit positioned to be taken by the vents The structure of the intermediate feeder, the technical characteristics of which are claimed, is as follows:
  Transport lines. These are represented in the drawings as four and are thus described as an example on having a known and frequently used arrangement, although the application can be extended to a different number of cells
  Each line is preferably made up of two adjacent conveyor belts traveling in the same direction at different speeds to facilitate the separation and positioning of the fruit. They are preferably arranged on different planes, forming a horizontal dihedral edge open upwards to take the fruit it transports.
  A detection means block, preferably photoelectric cells, on each transport line, located on top of the transition zone of the fruit from said lines to the cell transporter, so that some cells check the presence of fruit in each and all of the cells included in the transversal alignment being supplied, whilst other cells check the existence of fruit in the outlet ends of the feeder lines, arranged to be transferred to the tray or cell transporter.
  Articulation means of the supply line supports, preferably pneumatic cylinders, arranged so that they are able to alternately separate and bring nearer the outlet ends of the lines, making them turn on their inlet ends to supply the cells of a transversal alignment in which they are symmetrically moved towards the outside of the transporter; and to recover the parallelism positions of the lines to supply the cells of the following transversal alignment in which they are symmetrically grouped towards the central zone of the transporter, or vice versa.
  Magnetic or optical detection means of the arrangement of the cells in the alignment to be supplied, arranged underneath the inlet zone of the fruit to the transporter, and capable of directing the operation of the pneumatic cylinders that suitably position the supply lines.
  Means to check the existence of fruit at the feeder inlet, which control the starting or stopping of the conventional transporter to achieve regulated continuity of the general supply The feeder operates in the following way:

At the moment of completing the supply of a transversal alignment with the cells of the central zone of the transporter, the photoelectric cells located on said alignment detect this and order the space between the symmetry axes of two consecutive transversal alignments to go to the tray or the transporter. At the same time, other magnetic or optical detection means located underneath the inlet zone of the fruit check the change of position of the cells in the second alignment and order the pneumatic cylinders to operate by separating or bringing nearer the outlet ends of the fruit on the supply lines so that the cells of said second alignment can thus be loaded, displaced towards the outside of said alignment. The cycle is repeated when the pneumatic cylinders recover the initial parallelism of the supply lines.

The continuity in the supply is ensured by means of the photoelectric cells located on the outlet zone of the feeder, which make the lines advance when there is a lack of fruit on the outlet ends due to having been transferred to the tray or the cell transporter, whilst the loading of the feeder is ordered by a photoelectric cell that detects the lack of fruit in the inlet ends of the feeder line and orders the conventional transport to advance, acting as a supply regulator.

BRIEF DESCRIPTION OF THE DRAWINGS

To complement the description of the invention and facilitate the interpretation of the formal, structural and functional characteristics of its purpose, attached are drawings in which different aspects of a preferred performance of the "Automatic alternative fruit feeder to a cell receiver in quincunxes", constituting the purpose of this patent, are schematically represented.

In said drawings:

FIG. 1 shows a floor view of the arrangement of the supply lines, loading a transversal alignment of cells in which these are displaced towards the outside of the transporter.

FIG. 2 shows the arrangement of the same lines loading the following transversal alignment, in which the cells are symmetrically grouped towards the central zone of the transporter.

DESCRIPTION OF A PREFERRED PERFORMANCE

Figure 3:
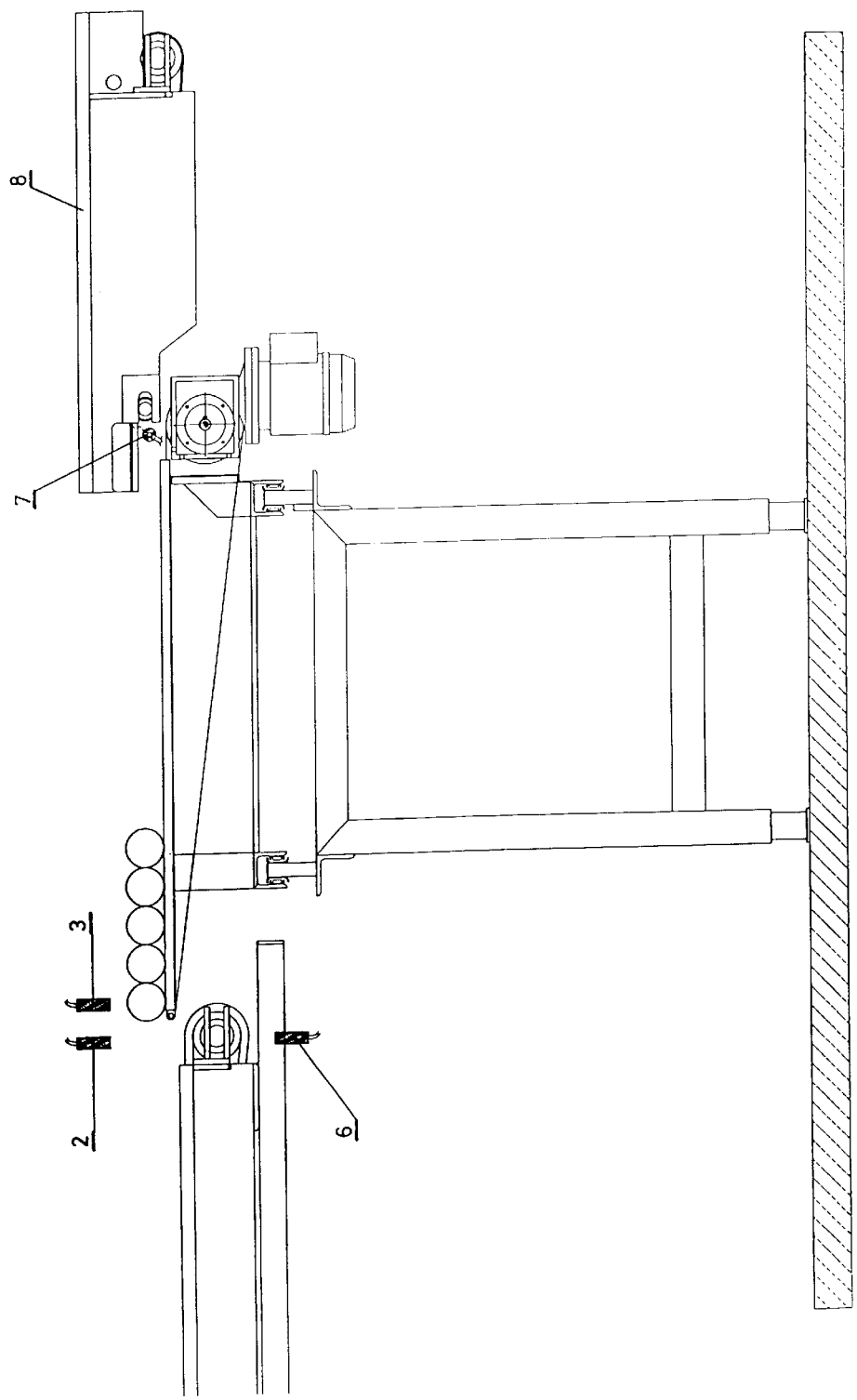
FIG. 3 is a side elevation of the complete supply system to a cell receiver in quincunxes, in which the claimed feeder is shown in its central position.

To clearly show the nature and scope of the advantageous application of the "Automatic alternating fruit feeder to a cell receiver in quincunxes", purpose of the claimed invention, the following is a description of its structure and the characteristics of its component elements, making reference to the drawings which, on representing a preferred performance of said purpose for information, must be considered in the widest sense and not limiting of the application and content of the claimed invention.

Its structure consists of:

Transport lines preferably formed by two adjacent conveyor belts (1)–(1') that go in the same direction at different speeds to facilitate the separation and positioning of the fruit. They are preferably arranged on different planes, forming a horizontal dihedral edge open upwards to take the fruit it transports, aligns and positions.

A detection means block, preferably photoelectric cells, on each transport line, located on top of the transition zone of the fruit from said lines to the cell transporter, so that some cells (2) check the presence of fruit in each and all of the cells included in the transversal alignment being supplied, whilst other cells (3) check the existence of fruit in the outlet ends of the feeder lines, arranged to be transferred to the tray or cell transporter.

Articulation means of the supply line supports, preferably pneumatic cylinders, arranged so that they are able to alternately separate and bring nearer the outlet ends of the lines, making them turn on their inlet ends to supply the cells of a transversal alignment (4) in which they are symmetrically moved towards the outside of the transporter (FIG. 1); and to recover the parallelism positions of the lines (FIG. 2) to supply the cells of the following transversal alignment (5) in which they are symmetrically grouped towards the central zone of the transporter.

Magnetic or optical detection means (6) of the arrangement of the cells in the alignment to be supplied, arranged underneath the inlet zone of the fruit to the transporter, and capable of directing the operation of the pneumatic cylinders that suitably position the supply lines.

Means (7) to check the existence of fruit at the feeder inlet, which control the starting or stopping of the conventional transporter (8) to achieve regulated continuity of the general supply It operates in the following way:

At the moment of completing the supply of a transversal alignment with the cells of the central zone of the transporter (FIG. 2), the photoelectric cells (2) located on said alignment detect this and order the space between the symmetry axes of two consecutive transversal alignments to go to the tray or the transporter. At the same time, other magnetic or optical detection means (6) located underneath the inlet zone of the fruit check the change of position of the cells in the second alignment and order the pneumatic cylinders to operate by separating or bringing nearer the outlet ends of the fruit on the supply lines so that the cells of said second alignment can thus be loaded, displaced towards the outside of said alignment. The cycle is repeated when the pneumatic cylinders recover the initial parallelism of the supply lines (FIG. 1).

The continuity in the supply is ensured by means of the photoelectric cells (3) located on the outlet zone of the feeder, which make the lines advance when there is a lack of fruit on the outlet ends due to having been transferred to the tray or the cell transporter; whilst the loading of the feeder is ordered by a photoelectric cell (7) that detects the lack of fruit in the inlet ends of the feeder line and orders the conventional transport (8) to advance, acting as a supply regulator.

What is claimed is:

1. Automatic alternating fruit feeder to a cell receiver in quincunxes, characterized by the fact that its structure consists of:

Transport lines preferably formed by two adjacent conveyor belts (1)–(1') that go in the same direction at different speeds to facilitate the separation and positioning of the fruit, They are preferably arranged on different planes, forming a horizontal dihedral edge open upwards to take the fruit it transports, aligns and positions;

A detection means block, preferably photoelectric cells, on each transport line, located on top of the transition zone of the fruit from said lines to the cell transporter, so that some cells (2) check the presence of fruit in each and all of the cells included in the transversal alignment being supplied, whilst other cells (3) check the existence of fruit in the outlet ends of the feeder lines, arranged to be transferred to the tray or cell transporter;

Articulation means of the supply line supports, preferably pneumatic cylinders, arranged so that they are able to alternately separate and bring nearer the outlet ends of the lines, making them turn on their inlet ends to supply the cells of a transversal alignment (4) in which they are symmetrically moved towards the outside of the transporter (FIG. 1); and to recover the parallelism positions of the lines (FIG. 2) to supply the cells of the following transversal alignment (5) in which they are symmetrically grouped towards the central zone of the transporter;

Magnetic or optical detection means (6) of the arrangement of the cells in the alignment to be supplied, arranged underneath the inlet zone of the fruit to the transporter, and capable of directing the operation of the pneumatic cylinders that suitably position the supply lines; and Means (7) to check the existence of fruit at the feeder inlet, which control the starting or stopping of the conventional transporter (8) to achieve regulated continuity of the general supply.

2. Automatic alternating fruit feeder to a cell receiver in quincunxes, according to claim 1, characterized by the fact that at the moment of completing the supply of a transversal alignment with the cells of the central zone of the transporter (FIG. 2), the photoelectric cells (2) located on said alignment detect this and order the space between the symmetry axes of two consecutive transversal alignments to go to the tray or the transporter, At the same time, other magnetic or optical detection means (6) located underneath the inlet zone of the fruit check the change of position of the cells in the second alignment and order the pneumatic cylinders to operate by separating or bringing nearer the outlet ends of the fruit on the supply lines so that the cells of said second alignment can thus be loaded, displaced towards the outside of said alignment, and The cycle is repeated when the pneumatic cylinders recover the initial parallelism of the supply lines (FIG. 1).

3. Automatic alternating fruit feeder to a cell receiver in quincunxes, according to claim 1, characterized by the fact that the continuity in the supply is ensured by means of the photoelectric cells (3) located on the outlet zone of the feeder, which make the lines advance when there is a lack of fruit on the outlet ends due to having been transferred to the tray or the cell transporter; whilst the loading of the feeder is ordered by a photoelectric cell (7) that detects the lack of fruit in the inlet ends of the feeder line and orders the conventional transport (8) to advance, acting as a supply regulator.

* * * * *